Nov. 21, 1933.  L. C. FE BLAND  1,936,387
STRAINER
Filed May 12, 1932
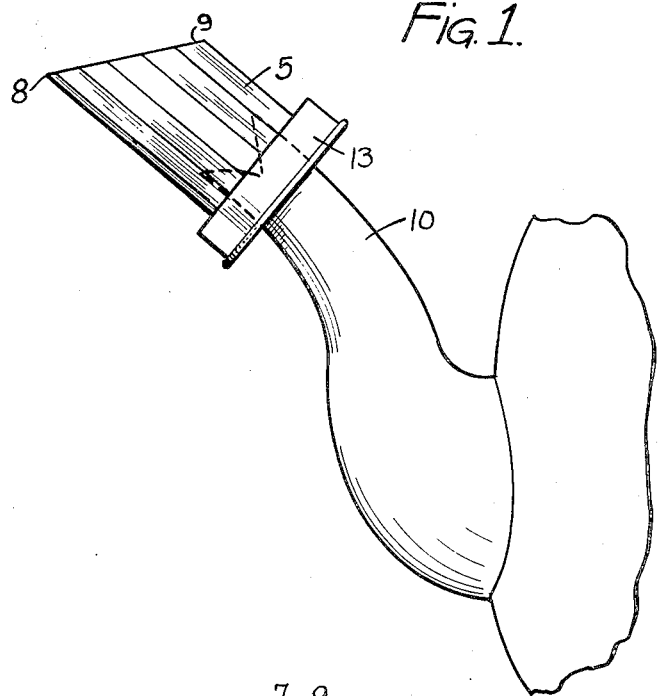
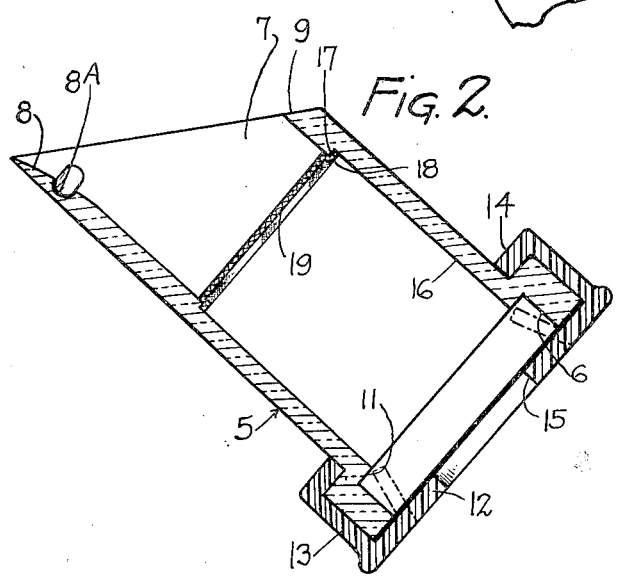
Inventor
LEON C. FE BLAND
By His Attorney Patented Nov. 21, 1933

1,936,387

UNITED STATES PATENT OFFICE 1,936,387

STRAINER

Leon C. Fe Bland, Brooklyn, N. Y., assignor to The Kleenti Co. Inc., a corporation of New York Application May 12, 1932. Serial No. 610,871

1 Claim. (Cl. 210—162)

This invention relates to strainers and particularly to a type adapted to be placed over the end of the spout of a coffee or tea pot in order to strain the tea or coffee as it is poured.

A particular object of my invention is to provide a strainer which has few parts, can be quickly applied to the spout of a coffee or tea pot and one which need not be removed during the pouring of the liquid.

A still further object of my invention is to provide a strainer of simplified and inexpensive construction which may be applied to the end of a spout, for instance, of a porcelain tea pot that has been chipped or broken to conceal the broken end thereof and at the same time operate to strain the beverage as it passes therethrough.

Devices of a similar nature have been equipped with a stamped or spun cup having strainer openings therein which, in addition to being an added part that had to be cleaned and materially adding to the expense of producing the strainer, materially detract from the appearance of the device. I have produced a strainer, the mesh strainer portion of which is arranged to be shrunk in as the body of the strainer cools during manufacture, thus materially reducing the cost of the strainer and rendering it easy to clean.

Changes and variations may be made in the construction shown and described without departing from the principles of the invention or sacrificing its chief advantages; hence such invention is not to be confined to the structures shown in the accompanying drawing, in which:

Figure 1 is a view showing the use of my improved strainer in connection with the spout of a teapot.

Figure 2 is an enlarged view in cross section taken through the tea strainer illustrated in Figure 1.

Referring to the drawing in detail and in particular to the tea strainer construction illustrated in Figures 1 and 2, 5 indicates the body portion of the strainer which is preferably made of bakelite moulded to provide an upper flanged edge 6 from which extends the tubular body portion 7, one edge of which as noted at 8 is extended beyond the diametrically opposite side 9 of the body, this extended side being the lower part of the strainer when the same is in use in connection with the spout 10 of a coffee or tea holding pot receptacle.

The flange 6 is offset from the body 5 and is also moulded to provide an undercut ledge 11 which is arranged to accommodate the annular edge 12 of a rubber top 13 which is arranged to snap over the flange 6 of the body of the strainer. This rubber cap is provided with a flange portion 14 which engages the under surface of the offset flange 6 of the body so that leakage of the liquid is prevented. The rubber cap is also provided with the central opening 15 bordered by the flange portion 12 hereinbefore referred to, said flange extending beyond the inner edge of the flange 6 of the body of the strainer so that it will yieldably fit about the upper end of the spout 10 of a coffee or tea pot and the undercut part 11 of the body will permit movement of the flange 12 of the cap completely inward so that it may be practically flush with the inner wall 16 of the body to accommodate spouts of a larger size.

In order to retain the straining unit in place, the inner wall 16 of the body 5 is provided with an annular ledge 17, upon which rests the flanged edge 18 of the strainer disk 19 which is preferably made of mesh wire or may be made of metal having fine perforations therein. In order to retain the strainer disk in place, the same is positioned on the ledge 17 of the body 5 immediately after the body is moulded and is taken from the die so that with the cooling of the body and resultant shrinkage thereof, the strainer disk is secured in position on the ledge 17.

It is also evident that both sides of the strainer disk may be readily cleansed and the device maintained in a sanitary condition.

One of the important features of my invention therefore is the fact that the strainer disk is shrunk in place as the bakelite body cools, thereby dispensing with any strainer holding means and suspending the strainer in such a manner that a maximum straining surface is obtained and the device adjacent the strainer is unobstructed and can be cleansed and maintained in sanitary condition.

Means are also provided in the extended portion 8 of the device for catching the last drop of liquid, preventing the same from dripping off the end of the device to soil table linen after a cup of tea or coffee has been poured and to this end I provide in the member 8, the notch or groove 8—A, which notch may be about a half inch long and deep enough to hold the remaining fluid that does not freely flow out of the strainer.

My invention is not to be restricted to the precise details of construction shown since various changes and modifications may be made therein without departing from the scope of the invention or sacrificing the advantages derived from its use.

What I claim is:—

A strainer comprising a tubular body portion having one side thereof extended, a groove formed in said extended portion and disposed near the outer end thereof and constituting a drip trough, a ledge formed in the body portion, a strainer disk positioned on said ledge and arranged to be shrunk in place during the cooling of said body portion, means for yieldably securing the strainer to a pot spout including a member having a central opening, the edge of the member at the opening being arranged to yield inwardly and fit closely about the pot spout to prevent leakage, a flange on the member for securing the same to the body portion, and an undercut ledge at one end of the body portion for accommodating the edge of the member when the same is forced inwardly.

LEON C. FE BLAND. [L. S.]